United States Patent
Park et al.

(10) Patent No.: US 8,565,332 B2
(45) Date of Patent: Oct. 22, 2013

(54) FIXED STATION RECEIVER FOR MIMO COMMUNICATION SYSTEM AND UPLINK ADAPTATION METHOD THEREOF

(75) Inventors: Ok-Sun Park, Daejeon (KR); Gi Yoon Park, Daejeon (KR); Young Jo Ko, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 416 days.

(21) Appl. No.: 13/017,888

(22) Filed: Jan. 31, 2011

(65) Prior Publication Data

US 2012/0002710 A1 Jan. 5, 2012

(30) Foreign Application Priority Data

Jul. 1, 2010 (KR) .................. 10-2010-0063501

(51) Int. Cl.
*H04B 7/02* (2006.01)
*H04L 1/02* (2006.01)
*H04L 7/00* (2006.01)
*H04L 23/00* (2006.01)

(52) U.S. Cl.
USPC ............ 375/267; 375/347; 375/358; 375/377

(58) Field of Classification Search
USPC ......... 375/219, 267, 295, 299, 316, 347, 358, 375/377; 455/95, 101, 130, 132
See application file for complete search history.

(56) References Cited

U.S. PATENT DOCUMENTS

| | | | | |
|---|---|---|---|---|
| 2009/0154588 A1* | 6/2009 | Chen et al. | ...................... | 375/267 |
| 2010/0142640 A1 | 6/2010 | Zhao et al. | | |
| 2011/0007833 A1* | 1/2011 | Nakayama | ...................... | 375/267 |
| 2012/0008722 A1* | 1/2012 | Serbetli et al. | ................ | 375/340 |

FOREIGN PATENT DOCUMENTS

| | | |
|---|---|---|
| JP | 2010-135915 | 6/2010 |
| KR | 10-0761818 | 9/2007 |
| KR | 10-2008-0074004 | 8/2008 |
| KR | 1020090126271 | 12/2009 |
| KR | 1020100043097 | 4/2010 |

* cited by examiner

*Primary Examiner* — Tesfaldet Bocure (74) *Attorney, Agent, or Firm* — Nelson Mullins Riley & Scarborough LLP (57) ABSTRACT

Provided are a fixed station receiver for a Multi-Input Multi-Output (MIMO) communication system and an uplink adaptation method thereof. In the uplink adaptation method, a sounding reference signal (SRS) is received from a terminal including a plurality of transmission antennas. A complex channel matrix (H) corresponding to a channel response and a noise variance ($\sigma^2$) corresponding to a noise power is calculated from the sounding reference signal. A signal-to-interference and noise ratio (SINR) on each transmission symbol is calculated with reference to the complex channel matrix (H) and the noise variance ($\sigma^2$). A pre-coding matrix of the terminal is selected with reference to the signal-to-interference and noise ratio (SINR).

13 Claims, 4 Drawing Sheets

FIXED STATION RECEIVER FOR MIMO COMMUNICATION SYSTEM AND UPLINK ADAPTATION METHOD THEREOF

CROSS-REFERENCE TO RELATED APPLICATIONS

This U.S. non-provisional patent application claims priority under 35 U.S.C. §119 of Korean Patent Application No. 10-2010-0063501, filed on Jul. 1, 2010, the entire contents of which are hereby incorporated by reference.

BACKGROUND OF THE INVENTION

The present invention disclosed herein relates to a mobile communication system, and more particularly, to a fixed station receiver for a Multi-Input Multi-Output (MIMO) communication system for providing a terminal using a pre-coding matrix that can increase channel capacity, and an uplink adaptation method thereof.

A channel between a transmitter and a receiver is not fixed in mobile communication systems. Accordingly, it is necessary to measure continuously changing a channel state and produce channel information, and recover a distorted transmission signal by referring to the produced channel information in a mobile communication system. Overall operations for producing the channel information are called channel estimation.

For channel estimation, it is necessary to frequently measure a channel between a transmitter and a receiver of a mobile communication system. For channel measurement, the transmitter and the receiver may transmit and receive appointed signals therebetween. By means of transmission and reception of the appointed signals, the receiver can perceive channel information such as an amplitude decrement and a phase transition value. The perceived channel information may be sent to the transmitter by feedback, or may be used as decoding resources to increase the reliability of the received data information. The appointed signals transmitted between the transmitter and the receiver for measurement of the channel are called Reference Signals (RS), Pilot Signals, or Sounding Reference Signals (SRS).

A $3^{rd}$ Generation Partnership Project (3GPP) Long-Term Evolution (LTE)-advanced system supports MIMO transmission such as transmission diversity and a spatial multiplexing method. Particularly, in order to satisfy 15 bps/Hz that is a maximum frequency efficiency of uplink, supporting of spatial multiplexing method is necessarily required. According to application of spatial multiplexing, an uplink data channel may transmit two or less codewords for each terminal.

A terminal of a typical LTE system includes one transmission antenna, while an LTE-advanced system may include two or more transmission antennas even in uplink. Accordingly, channel capacity in the LTE-advanced system may be maximized through linear signal processing between a transmitter and a receiver using a matrix product. In this case, the linear signal processing performed in the transmitter is called pre-coding. Technology of providing optimal pre-coding characteristics for maximizing the channel capacity or increasing multiplexing gain in the LTE-advanced system is urgently needed.

SUMMARY OF THE INVENTION

The present invention provides a fixed station receiver for a MIMO communication system for maximizing channel capacity of a terminal including a plurality of transmission antennas according to the channel state, and an uplink adaptation method thereof Embodiments of the present invention provide uplink adaptation methods including: receiving a sounding reference signal (SRS) from a terminal including a plurality of transmission antennas; calculating a complex channel matrix (H) corresponding to a channel response and a noise variance ($\sigma^2$) corresponding to a noise power from the sounding reference signal; calculating a signal-to-interference and noise ratio (SINR) on each transmission symbol with reference to the complex channel matrix (H) and the noise variance ($\sigma^2$); and selecting a pre-coding matrix of the terminal with reference to the signal-to-interference and noise ratio (SINR).

In other embodiments of the present invention, base station receiving devices of a communication system supporting Multi-Input Multi-Output (MIMO) include: one or more receiving antennas receiving a sounding reference signal (SRS) from a terminal; a fast Fourier transformer processing a received signal of the receiving antenna; and a sounding reference signal processing unit calculating a signal-to-interference and noise ratio (SINR) on each transmission symbol received from a sounding reference signal delivered from the fast Fourier transformer to select a pre-coding matrix of the terminal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, a transmitter-receiver of a $3^{rd}$ Generation Partnership Project (3GPP) Long-Term Evolution (LTE)-advanced system will be used as an example for describing the features and function of the present invention. Also, DFT Spread-OFDM (DFT-SOFDMA) or Single-Carrier FDMA (SC-FDMA) will be exemplarily described as a multiple access scheme. However, other advantages and performances of the present invention may be understood by those skilled in the art in accordance with descriptions set forth herein.

The present invention can be implemented in or applied to other embodiments. In addition, detailed description can be amended or modified according to perspective and application without departing from the scope, spirit, and other objectives of the present invention. Hereinafter, exemplary embodiments of the present invention will be described in detail with reference to the accompanying drawings.

Figure 1:
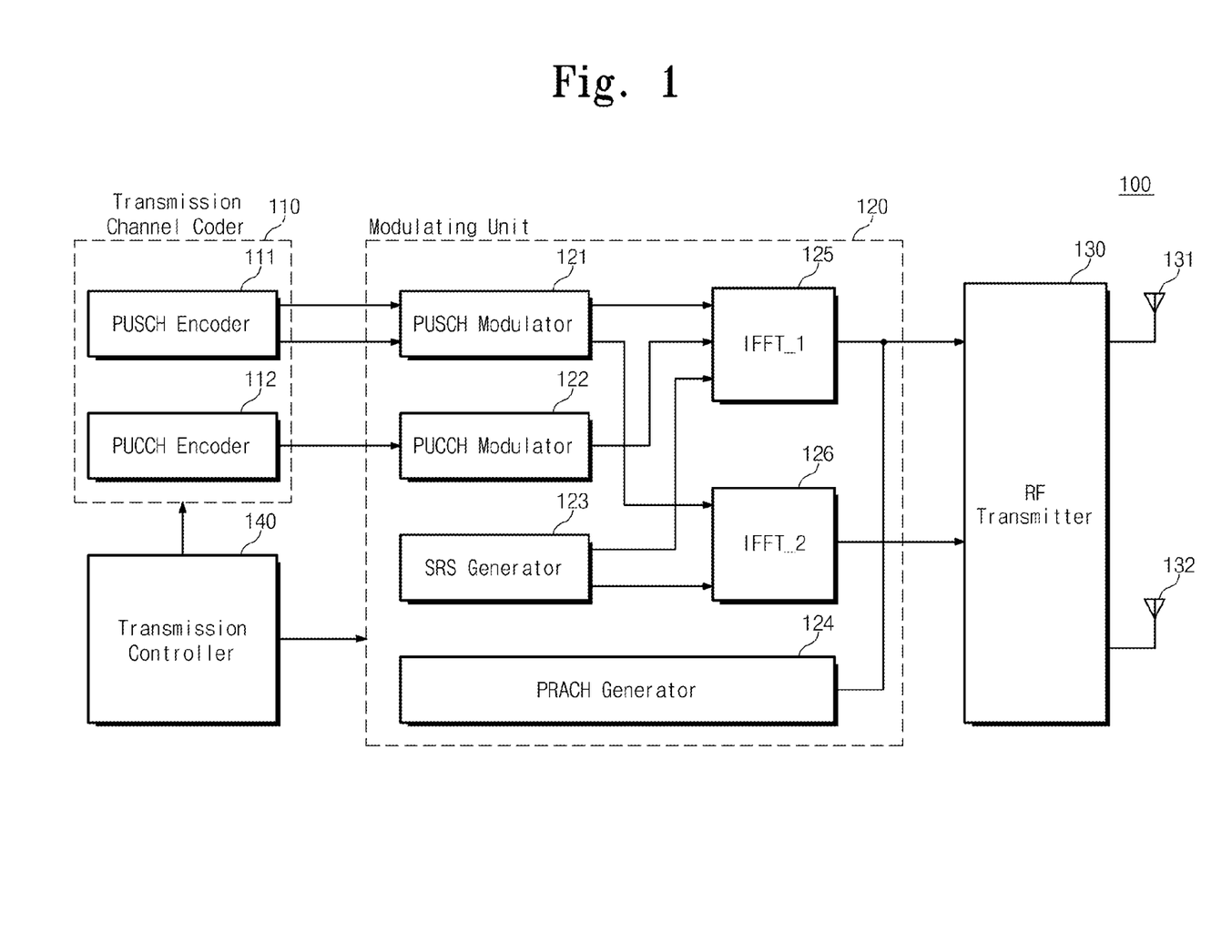
FIG. 1 is a block diagram illustrating a terminal according to an embodiment of the present invention.

FIG. 1 is a block diagram illustrating a terminal according to an embodiment of the present invention. Referring to FIG. 1, a terminal 100 according to an embodiment of the present invention may include a transmission channel coder 110, a modulating unit 120, an RF transmitter 130, and a transmission controller 140. It will be assumed that the terminal 100 includes two transmission antennas.

The transmission channel coder 110 may perform encoding for transmitting information generated in an upper layer of the terminal 100 to a physical layer and a physical channel. The transmission channel coder 110 may perform coding for each transmission channel and control information. Examples of coding methods of the transmission channel coder 110 may include a turbo code, a convolutional code, and the like. The transmission channel coder 110 may include an uplink shared channel encoder 111 and an uplink control channel encoder 112.

The uplink shared channel encoder 111 may encode message data processed in a baseband and feedback information on a downlink. The uplink shared channel encoder 111 may deliver coded data, i.e., codeword to the modulating unit 120 according to the control of the transmission controller 140. Here, the uplink shared channel encoder 111 may deliver two or less codewords transmitted by two antennas to the modulating unit 120.

The uplink control channel encoder 112 may encode control information to be delivered to a base station through an uplink control channel PUCCH according to the control of the transmission controller 140. The control information may include ACK/NACK on a downlink shared channel. Also, the control information may include Channel Quality Indication (CQI) or resource request of an uplink shared channel PUSCH. CQI may be information for scheduling of a frequency domain on the downlink shared channel PDSCH.

The modulating unit 120 may perform modulation for each physical channel and physical signal. To this end, the modulating unit 120 may include an uplink shared channel modulator 121, an uplink control channel modulator 122, a Sounding Reference Signal (SRS) generator 123, a Physical Random Access Channel (PRACH) generator 124, inverse Fourier transformers 125 and 126.

The uplink shared channel modulator 121 may modulate two or less codewords provided from the uplink shared channel encoder 111. The uplink shared channel modulator 121 may perform constellation mapping in a signal space on the codewords channel-coded in the transmission channel coder 110. The codewords mapped in the signal space may be generated as data symbols. The data symbols may be assigned to a plurality of sub-carriers to be transmitted by the uplink shared channel modulator 121 via each antenna. The data symbols mapped to the plurality of sub-carriers may be delivered to different inverse Fourier transformers 125 and 126.

The uplink control channel modulator 122 may perform channel modulation on the control information to be transmitted through the uplink control channel PUCCH. The uplink control channel modulator 122 may be configured to have functions and configuration similar to those of the uplink shared channel modulator 121.

The SRS generator 123 may deliver a Sounding Reference Signal (SRS) to different Fourier transformers 125 and 126. The SRS may be a reference signal that the terminal 100 sends to a base station (not shown) for uplink scheduling. The SRS may be configured to constitute the last symbol in a transmitted subframe. The SRS generated in the SRS generator 123 may be transmitted to any one selected from a plurality of antennas 131 and 132 every transmission period.

The PRACH generator 124 may generate a random access preamble. The random access may be a contention-based access procedure used in the initial access of the terminal 100 to the base station (not shown). In the LTE standard, the terminal 100 is defined to quickly access the base station using minimum wireless resources.

The inverse Fourier transformers 125 and 126 may perform M-point inverse transform on the modulated data symbol, the control signal, and the sounding reference signal that are provided from the uplink shared channel modulator 121, the uplink control channel modulator 122, and the sounding reference signal (SRS) generator 123, respectively.

The RF transmitter 130 may transmit a transmission signal vector outputted from the modulator unit 120 via the antennas 131 and 132, respectively. The transmission controller 140 may control overall coding and modulating operations of the terminal 100.

Figure 2:
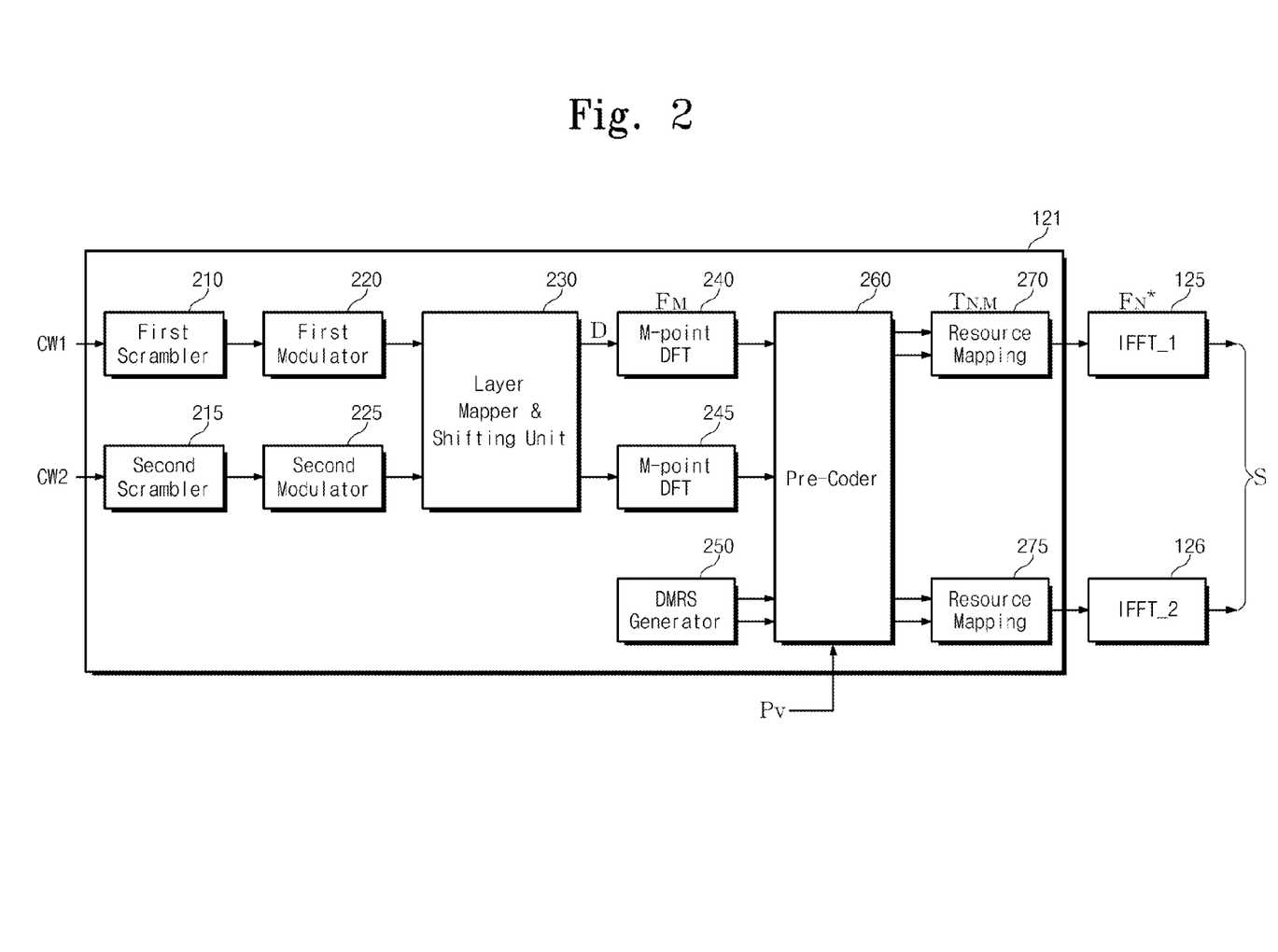
FIG. 2 is a block diagram illustrating concrete functions and configurations of an uplink shared channel modulator (121) of FIG. 1.

FIG. 2 is a block diagram illustrating concrete functions and configurations of the uplink shared channel modulator 121 of FIG. 1. Referring to FIG. 2, two codewords CW1 and CW2 may undergo modulation and pre-coding, and M-point DFT operation by the uplink shared channel modulator 121.

First and second scramblers 210 and 215 may scramble the inputted codewords CW1 and CW2. Bits constituting the respective codewords CW1 and CW2 may be scrambled by a seed value defined by a terminal.

First and second modulators 220 and 225 may modulate the scrambled bits of the codewords according to a modulation mapping method. That is the first and second modulators 220 and 225 may convert the scrambled bits of the codewords into complex symbols.

A layer mapper & shifting unit 230 may map and shift the complex symbol provided from the first and second modulators 220 and 225 to a transmission layer, and then the complex symbol may be mapped into complex signals corresponding to the respective antennas. The complex signals corresponding to the respective antennas may be expressed as $D=[D^{(0)} D^{(1)} \ldots D^{(L-1)}]$, where L denotes the number of transmission symbols. An 'l'-th transmission symbol may be expressed as a vector including elements corresponding to the number of sub-carriers. That is, the 'l'-th transmission symbol vector may be expressed as Equation 1 below.

$$D^{(l)}=[d_0 d_1 \ldots d_{M-1}]^T \qquad (1)$$

M-point DFT units 240 and 245 may perform discrete Fourier transform (DFT) operations on the transmission symbol vector provided from the layer mapper & shifting unit 230. The transmission symbol vector may be outputted as a vector of a frequency domain by the discrete Fourier transform operations.

A DMRS generator 250 may provide a reference signal necessary for demodulation of signals that are transmitted to the uplink shared channel (PUSCH) and the uplink control channel (PUCCH). A signal used in demodulation of data of a receiving side may be called DeModulation Reference Signal (DMRS). In a multiplexing method of SC-FDMA type, demodulation performance of a receiving side with respect to a symbol may be closely related to the location of DMRS. That is, a SC-FDMA symbol adjacent to DMRS may have demodulation performance of fewer errors.

A pre-coder 260 may process symbols mapped to each layer by MIMO manners corresponding to a plurality of antennas to output an antenna specific symbol. The pre-coder 260 may perform a linear operation of a pre-coding matrix with respect to the discrete Fourier transformed transmission symbol vectors and DRMS signal. That is, the pre-coder 260 may be provided with a pre-coding matrix Pv selected by optimal values with respect to the terminal to perform an operation for maximizing channel capacity.

The resource mapping units 270 and 275 may perform a layer mapping on symbols diffused by the pre-coder 260 according to ranks. The layer-mapped symbols may be mapped to resource elements. The transmission symbol vector outputted from the resource mapping units 270 and 275 may be provided to the above-described inverse Fourier transformers 125 and 126. The transmission signal vector processed by the inverse Fourier transformers 125 and 126 may be outputted as a transmission signal vector S. The transmission signal vector S may be expressed as Equation (2) below.

$$S = F_N^* T_{N,M} P_V F_M D \qquad (2)$$

where D is a transmission symbol vector, FM is M-point DFT, PV is a pre-coding matrix, TN,M is a response characteristic of a resource mapping unit when a transmission symbol is mapped using M sub-carriers among the total N sub-carriers, and FN* denotes a response characteristic corresponding to N-point inverse Fourier transform.

Figure 3:
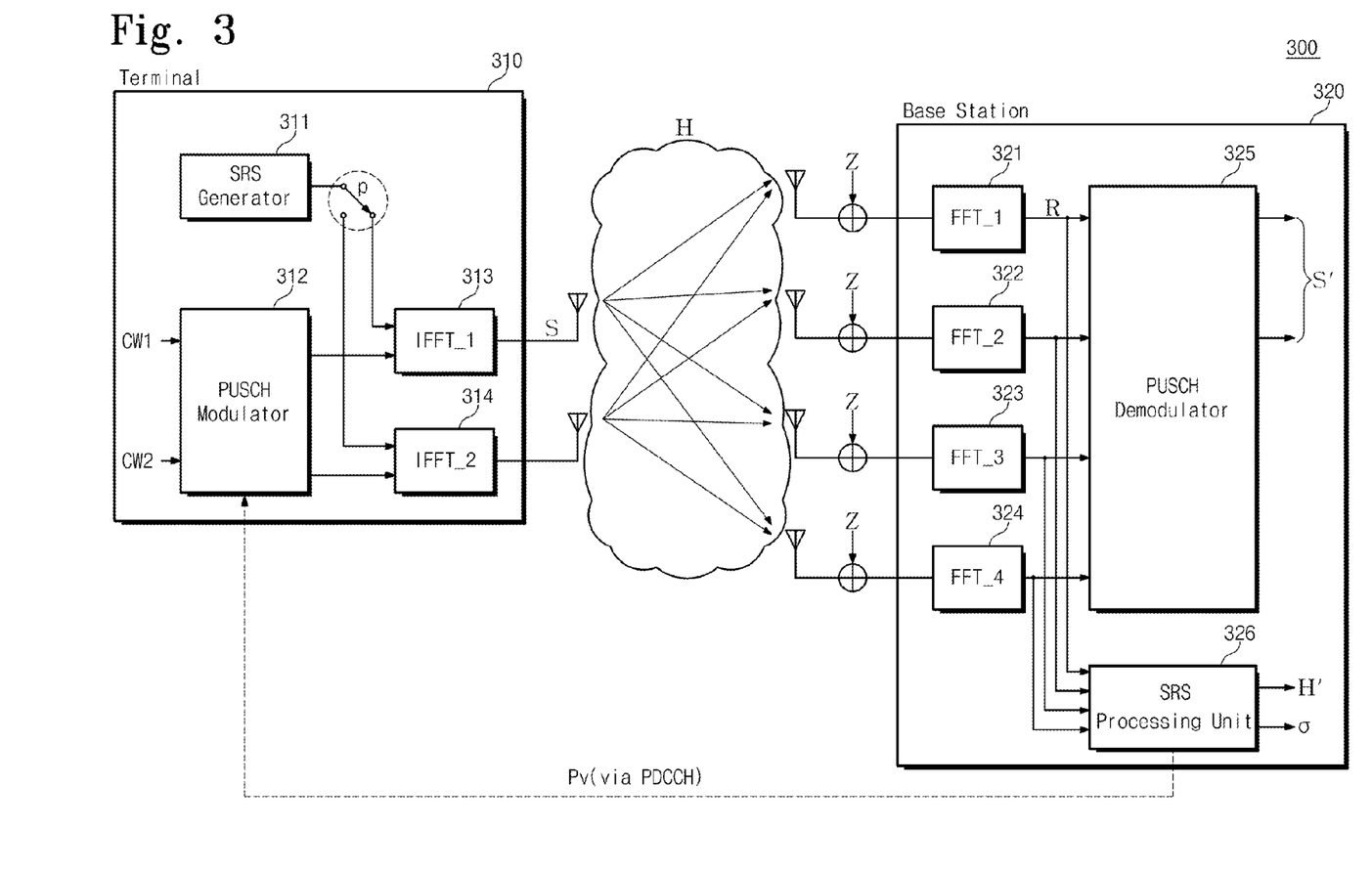
FIG. 3 is a block diagram illustrating a structure of a mobile communication system according to an embodiment of the present invention.

FIG. 3 is a block diagram illustrating a structure of a mobile communication system according to an embodiment of the present invention. Referring to FIG. 3, a mobile communication system 300 according to an embodiment of the present invention may include a terminal 310 transmitting a signal using two transmission antennas through a spatial multiplexing method, and a base station 320 receiving the transmitted signal using a plurality of receiving antennas.

The terminal 310 may include an SRS generator 311, an uplink shared channel modulator 312 modulating a plurality of codewords (e.g., CW1 and CW2) to an uplink transmission signal, and inverse Fourier transformers 313 and 314. The terminal 310 may include a codebook (not shown) corresponding to a pre-coding matrix Pv received from the base station 320 by feedback. Here, the uplink shared channel modulator 312 and inverse Fourier transformers 313 and 314 may have the substantially same configurations as that in FIG. 1 or 2.

The SRS generator 311 may generate a sounding reference signal SRS to be transmitted to one of transmission antennas of the terminal 310. The SRS may be transmitted through a single antenna without separate pre-coding process. However, the SRS transmission may also satisfy Multi-Input Multi-Output (MIMO) transmission that is a requirement of LTE-advanced uplink transmission. Accordingly, the terminal 310 including the plurality of antennas has to transmit an SRS using the plurality of antennas so as to obtain a MIMO complex channel matrix in an SRS transmission period. For example, let us suppose a terminal supporting P MIMO transmission. When an SRS is transmitted in wideband without a frequency hopping, an antenna index may be selected as 'p=n mod P' to transmit an n-th SRS.

Although not shown, the codebook may include a plurality of pre-coding matrix according to the antenna scheme and pre-coding scheme of the terminal 310. The codebook may include a plurality of pre-coding matrixes corresponding to a Pre-coding Matrix Index (PMI) selected and feedbacked in the base station 320. Accordingly, the pre-coding matrix Pv of the codebook may be provided to the uplink shared channel modulator 312 according to the PMI selected from the base station 320. The pre-coding matrix may be selected using values for maximizing uplink channel capacity according to the number of antennas or the channel state, and maximizing the spatial multiplexing gain.

When the terminal 310 transmits an SRS over $M_{SRS}$ sub-carriers transmission bands via an antenna of an index p, an SRS processing unit 326 of the base station 320 may estimate channel state information with reference to the SRS received via J receiving antennas. The SRS processing unit 326 may configure a MIMO complex channel matrix H by storing the last channel state for each transmission antenna every transmission period.

A transmission signal vector S outputted by the above-described terminal 310 may be delivered to the base station 320 via a wireless channel. When a frequency domain channel response from an i-th (i=0, 1) transmission antenna to a j-th (0≤j≤J−1) receiving antenna at a k-th sub-carrier location is expressed as ($H_k^{ij}$) the complex channel matrix H estimated in the SRS processing unit 326 may be expressed as Equation 3 below $$H = \begin{bmatrix} H_k^{00} & H_k^{10} \\ H_k^{01} & H_k^{11} \\ \vdots & \vdots \\ H_k^{0(J-1)} & H_k^{1(J-1)} \end{bmatrix} \qquad (3)$$

The base station 320 may receive a received signal via a channel corresponding to the complex channel matrix H via a plurality of antennas. The received signal may be converted into a received signal vector R of the frequency domain by fast Fourier transformers FFT_1, FFT_2, FFT_3, and FFT_4 corresponding to the plurality of antennas, respectively.

The received signal vector R may output a transmission symbol S' according to procedures of equalizer and inverse discrete Fourier transform (IDFT) by an uplink shared channel demodulator 325.

The SRS processing unit 326 may calculate a complex channel matrix H' and a noise variance $\sigma^2$ with reference to the SRS. The noise variance $\sigma^2$ may correspond to a noise power. The SRS processing unit 326 may calculate the complex channel matrix H' and the noise variance $\sigma^2$ from the SRS received every transmission period of the SRS. The SRS processing unit 326 may calculate a current channel state and an optimal pre-coding matrix Pv corresponding to the antenna from the complex channel matrix H' and the noise variance $\sigma^2$. The SRS processing unit 326 may feedback the calculated optimal pre-coding matrix Pv to the terminal 310.

The feedback of the pre-coding matrix Pv by the SRS processing unit 326 may be variously modified. For example, the SRS processing unit 326 may map the calculated pre-coding matrix Pv to a predefined Pre-coding Matrix Index (PMI) of the codebook. The SRS processing unit 326 may provide the mapped PMI to a base station scheduler (not shown). When assigning an uplink shared channel to the terminal 310 supporting MIMO transmission, the base station scheduler (not shown) may deliver the latest selected precoding matrix index PMI through a downlink control channel PDCCH.

When calculating a pre-coding matrix Pv to reduce the complexity of operation, the SRS processing unit 326 may induce a Signal-to Interference and Noise Ratio (hereinafter, referred to as SINR) according to the number of transmission symbols. A process for inducing the SINR will be described in detail below.

An N-point FFT operation may be performed by a j-th fast Fourier transformer among fast Fourier transformers 321, 322, 323 and 324. A received signal vector R of the frequency domain generated by the N-point FFT operation may be expressed as Equation 4 below.

$$R = HT_{N,M}P_v F_M D + Z \quad (4)$$

Here, Z added to a receiving end corresponds to a Gaussian noise. Accordingly, the received signal vector R may be a signal vector in which the transmission signal vector S of Equation 2 is multiplied by the complex channel matrix H, and then the Gaussian noise Z is added thereto. When an equalization vector of the frequency domain is G, a deterministic signal vector D' outputted by an inverse discrete Fourier transform IDFT may be expressed as Equation 5 below.

$$D' = F_M^* T_{N,M}^* G(HT_{N,M}P_v F_M D + Z) \quad (5)$$

where since . . . , Equation 5 may be simplified as Equation 6.

$$D' = F_M^* GH_v F_M D + F_M^* T_{N,M} GZ \quad (6)$$

where Hv=HPv is a frequency response of a pre-coded channel.

On the other hand, when a criteria for maximizing the channel capacity is applied to a terminal as a method for selecting an optimal pre-coding matrix, the pre-coding matrix may be expressed as Equation 7 below.

$$P_v = \underset{P_v \in P}{\operatorname{argmax}} \left\{ \sum_{l=0}^{L-1} \log_2(1 + SINR^{(l)}) \right\} \quad (7)$$

$$\approx \underset{P_v \in P}{\operatorname{argmax}} \left\{ \prod_{l=0}^{L-1} (1 + SINR^{(l)}) \right\}$$

Thus, when the SINR is calculated on each transmission symbol, the SRS can be used.

When the terminal transmits the SRS using the antenna of an index p, the demodulator of the base station may estimate channel state information received from a p-th antenna to J antennas with respect to $M_{SRS}$ sub-carriers transmission bands. The SRS processing unit 326 may configure a MIMO complex channel matrix H by storing the last channel state for each transmission antenna every transmission period of the SRS.

When one transmission symbol is transmitted, the pre-coding matrix Pv may be expressed as $Pv = [v_0 \ v_1]^T$, and the channel matrix Hv having undergone the pre-coding may be expressed as Equation 8 below.

$$H_v = \begin{bmatrix} H_{v,k}^0 \\ H_{v,k}^1 \\ \vdots \\ H_{v,k}^{J-1} \end{bmatrix} = \begin{bmatrix} v_0 H_k^{00} + v_1 H_k^{10} \\ v_0 H_k^{01} + v_1 H_k^{11} \\ \vdots \\ v_0 H_k^{0(J-1)} + v_1 H_k^{1(J-1)} \end{bmatrix} \quad (8)$$

Accordingly, when one transmission symbol is transmitted in a DFT-SOFDMA system supporting MIMO, and a Minimum Mean Square Error (MMSE) receiving algorithm is applied, the SINR may be expressed as Equation 9 below.

$$SINR = \frac{P_S}{I + \hat{\sigma}^2} = \left( \left( \frac{1}{M} \sum_{k=0}^{M-1} \frac{\sum_{j=0}^{J-1} |H_{v,k}^j|^2}{\sum_{j=0}^{J-1} |H_{v,k}^j|^2 + \sigma^2} \right)^{-1} - 1 \right)^{-1} \quad (9)$$

When two transmission symbol is transmitted, the pre-coding matrix may be expressed as $P_v = 1_2\sqrt{2}$. Accordingly, the channel matrix having undergone the pre-coding may be expressed as $H_v = HP_v = H/\sqrt{2}$. When an MMSE receiving algorithm is applied, the frequency domain equalization vector G may be expressed as Equation 10 below.

$$G = (H_v^H H_v + L \cdot \sigma^2 I_L)^{-1} H_v^H \quad (10)$$

$$= \frac{1}{\text{Det}} \begin{bmatrix} \sum_{j=0}^{J-1} |H_{v,k}^{1j}|^2 + 2\sigma^2 & -\sum_{j=0}^{J-1} H_{v,k}^{0j*} \cdot H_{v,k}^{1j} \\ -\sum_{j=0}^{J-1} H_{v,k}^{1j*} \cdot H_{v,k}^{0j} & \sum_{j=0}^{J-1} |H_{v,k}^{0j}|^2 + 2\sigma^2 \end{bmatrix}$$

$$\begin{bmatrix} H_{v,k}^{00*} & H_{v,k}^{01*} & H_{v,k}^{02*} & H_{v,k}^{03*} \\ H_{v,k}^{10*} & H_{v,k}^{11*} & H_{v,k}^{12*} & H_{v,k}^{13*} \end{bmatrix}$$

$$= \frac{1}{\text{Det}} \begin{bmatrix} \alpha_0 & \alpha_1 & \alpha_2 & \alpha_3 \\ \beta_0 & \beta_1 & \beta_2 & \beta_3 \end{bmatrix}$$

where $$\text{Det} = \sum_{j=0}^{J-1} |H_{v,k}^{0j}|^2 \sum_{j=0}^{J-1} |H_{v,k}^{1j}|^2 + 2\sum_{j=0}^{J-1} |H_{v,k}^{0j}|^2 \sigma^2 +$$

$$2\sum_{j=0}^{J-1} |H_{v,k}^{1j}|^2 \sigma^2 + 4\sigma^2 - \left| \sum_{j=0}^{J-1} H_{v,k}^{0j*} \cdot H_{v,k}^{1j} \right|^2$$

Accordingly, when two transmission symbols are transmitted in a DFT-SOFDMA system supporting MIMO, and an MMSE receiving algorithm is applied, SINR on each transmission symbol index l may be expressed as Equation 11 below.

$$SIN^l = \frac{P_s^l}{I_l + \hat{\sigma}_l^2} = \left( \left( \frac{\Lambda_l}{M} \right)^{-1} - 1 \right)^{-1}, l = 0, 1 \quad (11)$$

where

-continued $$\Lambda_0 = \frac{\left|\sum_{k=0}^{M-1}\left\{\left(\sum_{j=0}^{J-1}|H_{v,k}^{0j}|^2\sum_{j=0}^{J-1}|H_{v,k}^{1j}|^2 + 2\sum_{j=0}^{J-1}|H_{v,k}^{0j}|^2\sigma^2 - \left|\sum_{j=0}^{J-1}H_{v,k}^{0j*}\cdot H_{v,k}^{1j}\right|^2\right)\Big/\mathrm{Det}\right\}\right|^2}{\sum_{k=0}^{M-1}\left\{\left(\left(\sum_{j=0}^{J-1}|H_{v,k}^{0j}|^2\sum_{j=0}^{J-1}|H_{v,k}^{1j}|^2 + 2\sum_{j=0}^{J-1}|H_{v,k}^{0j}|^2\sigma^2 - \left|\sum_{j=0}^{J-1}H_{v,k}^{0j*}\cdot H_{v,k}^{1j}\right|^2\right)^2 + \right.\right.\left.\left.\sigma^2\left(4\left|\sum_{j=0}^{J-1}H_{v,k}^{0j*}\cdot H_{v,k}^{1j}\right|^2\sigma^2 + \sum_{j=0}^{J-1}|\alpha_j|^2\right)\right)\Big/\mathrm{Det}^2\right\}}$$

$$\Lambda_1 = \frac{\left|\sum_{k=0}^{M-1}\left\{\left(\sum_{j=0}^{J-1}|H_{v,k}^{0j}|^2\sum_{j=0}^{J-1}|H_{v,k}^{1j}|^2 + 2\sum_{j=0}^{J-1}|H_{v,k}^{0j}|^2\sigma^2 - \left|\sum_{j=0}^{J-1}H_{v,k}^{0j*}\cdot H_{v,k}^{1j}\right|^2\right)\Big/\mathrm{Det}\right\}\right|^2}{\sum_{k=0}^{M-1}\left\{\left(\left(\sum_{j=0}^{J-1}|H_{v,k}^{0j}|^2\sum_{j=0}^{J-1}|H_{v,k}^{1j}|^2 + 2\sum_{j=0}^{J-1}|H_{v,k}^{0j}|^2\sigma^2 - \left|\sum_{j=0}^{J-1}H_{v,k}^{0j*}\cdot H_{v,k}^{1j}\right|^2\right)^2 + \right.\right.\left.\left.\sigma^2\left(4\left|\sum_{j=0}^{J-1}H_{v,k}^{0j*}\cdot H_{v,k}^{1j}\right|^2\sigma^2 + \sum_{j=0}^{J-1}|\beta_j|^2\right)\right)\Big/\mathrm{Det}^2\right\}}$$

Accordingly, by applying the SINR calculated according to the number of transmission symbols according to each pre-coding matrix of the codebook, a pre-coding matrix that maximizes the channel capacity may be selected as shown in Equation 7.

Figure 4:
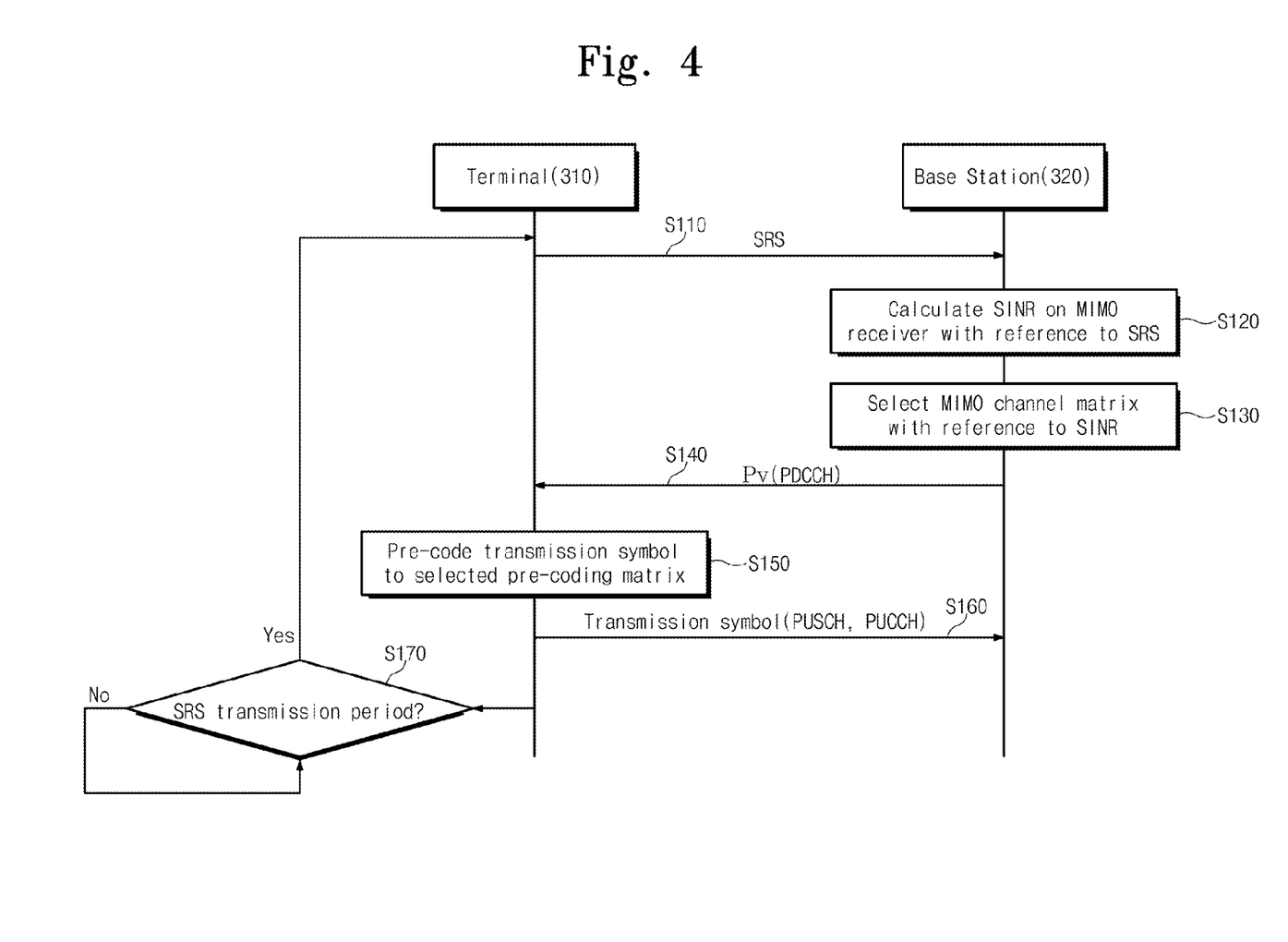
FIG. 4 is a call processing diagram illustrating an interaction between a terminal and a base station of FIG. 3.

FIG. 4 is a call processing diagram illustrating an interaction between the terminal and the base station of FIG. 3. Referring to FIG. 4, operations of the terminal 310 and the base station 320 for selecting an optimal pre-coding matrix are sequentially illustrated. Here, the interaction between the terminal 310 and the base station 320 for selecting the pre-coding matrix will be described on the basis of the period of the SRS.

In operation S110, the terminal 310 may transmit an SRS to the base station 320. The terminal 310 may process the SRS generated in the SRS generator (123 of FIG. 1) using the inverse discrete Fourier transformers 125 and 126 to transmit it to a plurality of antennas.

In operation S120, the base station 320 may receive the SRS from the terminal 310, and calculate an SINR on a MIMO receiver of the base station 320. In the uplink shared channel modulator (324 of FIG. 3) of the base station 320, a complex channel matrix H' and a noise variance $\sigma^2$ may be calculated with reference to the SRS according to demodulation procedure. The SRS processing unit 326 may receive the complex channel matrix H' and the noise variance $\sigma^2$ to calculate the SINR on each transmission symbol.

In operation S130, the SRS processing unit 326 of the base station 320 may select an optimal pre-coding matrix with reference to the calculated SINR. The pre-coding matrix selected by the SRS processing unit 326 may be converted into a value of a predetermined pre-coding matrix index (PMI).

In operation S140, the optimal pre-coding matrix Pv selected by the SRS processing unit 326, or the PMI may be delivered to a scheduler. When assigning an uplink shared channel PUSCH to the terminal 310 supporting MIMO transmission, the scheduler (not shown) of the base station 320 may feedback the latest selected pre-coding matrix through a downlink control channel PDCCH.

In operation S150, the terminal 310 may configure the pre-coding matrix delivered from the base station 320. The uplink shared channel modulator 311 of the terminal may execute pre-coding on the transmission symbol based on the feedbacked pre-coding matrix.

In operation S160, the terminal 310 may transmit the transmission symbol generated by optical pre-coding operation to the base station 320 via a plurality of transmission antennas.

In operation S170, the base station 320 may detect the return of the transmission period of the SRS. If a next transmission period of the SRS does not arrive, the base station 310 may wait until the next transmission period of the SRS arrives. However, if the next transmission period of the SRS arrives, the terminal 310 may return to operation S110 for transmitting the SRS to the base station 320.

For the following embodiments, elements and features of the present invention are combined in prescribed forms. Each of the elements or features should be considered as selective unless there is separate and explicit mention. Each of the elements or features can be implemented without being combined with others. And, it is able to construct an embodiment of the present invention by combining partial elements and/or features of the present invention. The order of operations explained in the following embodiments of the present invention can be changed.

Some partial configurations or features of a prescribed embodiment can be included in another embodiment and/or may be replaced by corresponding configurations or features of another embodiment. It will be apparent that embodiments can be configured by combining claims that do not have an explicit citation relation therebetween and can be added as new claims through amendment after filing.

In this disclosure, embodiments of the present invention are described mainly with reference to data transmitting and receiving relations between a base station and a terminal. In this case, the base station has a meaning of a terminal node of a network, which directly performs communication with the terminal. In this disclosure, a specific operation described as performed by a base station can be carried out by an upper node of the base station. Namely, it is understood that various operations carried out by a network, which includes a plurality of network nodes including a base station, for the communication with a terminal can be carried out by the base station or other network nodes except the base station. "Base station"

can be replaced by such a terminology as a fixed station, Node B, eNode B (eNB), access point and the like. And, "terminal" can be replaced by such a terminology as UE (user equipment), MS (mobile station), MSS (mobile subscriber station) and the like.

Embodiments of the present invention can be implemented by various means, e.g., hardware, firmware, software, and any combination thereof. In case of the implementation by hardware, embodiments of the present invention can be implemented by at least one of Application Specific Integrated Circuits (ASICs), DIGITAL SIGNAL PROCESSORS (DSPs), Digital Signal Processing Devices (DSPDs), Programmable Logic Devices (PLDs), Field Programmable Gate Arrays (FPGAs), a processor, a controller, a microcontroller, a microprocessor, etc.

In case of implementation by firmware or software, embodiments of the present invention can be implemented by a module, procedure, function and the like capable of performing the above mentioned functions or operations. Software code is stored in a memory unit and can be driven by a processor. The memory unit is provided within or outside the processor to exchange data with the processor by various means known in public.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An uplink adaptation method comprising:
   receiving a sounding reference signal (SRS) from a terminal including a plurality of transmission antennas;
   calculating a complex channel matrix (H) corresponding to a channel response or a noise variance ($\sigma^2$) corresponding to a noise power from the sounding reference signal;
   calculating a signal-to-interference and noise ratio (SINR) on each transmission symbol with reference to the complex channel matrix (H) or the noise variance ($\sigma^2$); and
   selecting a pre-coding matrix of the terminal with reference to the signal-to-interference and noise ratio (SINR).

2. The uplink adaptation method of claim 1, wherein the sounding reference signal (SRS) is periodically delivered.

3. The uplink adaptation method of claim 2, wherein the sounding reference signal (SRS) is transmitted to any one selected from the plurality of transmission antennas.

4. The uplink adaptation method of claim 3, further comprising storing a final channel state on the selected antenna every transmission period of the sounding reference signal.

5. The uplink adaptation method of claim 4, wherein the complex channel matrix (H) is configured from the final channel state.

6. The uplink adaptation method of claim 1, wherein the selecting of the pre-coding matrix comprises selecting any one of pre-coding matrixes for providing the largest channel capacity with reference to a value of the signal-to-interference and noise ratio (SINR).

7. The uplink adaptation method of claim 1, further comprising determining any one of the plurality of antennas for transmitting the sounding reference signal every transmission period of the sounding reference signal.

8. The uplink adaptation method of claim 1, further comprising feedbacking the selected pre-coding matrix to the terminal.

9. The uplink adaptation method of claim 8, wherein the selected pre-coding matrix is provided to the terminal via a downlink control channel.

10. The uplink adaptation method of claim 8, wherein the selected pre-coding matrix is mapped in a pre-coding matrix index to be feedbacked to the terminal.

11. A base station receiving device of a communication system supporting Multi-Input Multi-Output (MIMO), the device comprising:
    one or more receiving antennas receiving a sounding reference signal (SRS) from a terminal;
    a fast Fourier transformer processing a received signal of the receiving antenna; and
    a sounding reference signal processing unit calculating a signal-to-interference and noise ratio (SINR) on each transmission symbol received from a sounding reference signal delivered from the fast Fourier transformer to select a pre-coding matrix of the terminal.

12. The base station receiving device of claim 11, wherein the sounding reference signal processing unit calculates a complex channel matrix (H) corresponding to a channel response and a noise variance ($\sigma^2$) corresponding to a noise power.

13. The base station receiving device of claim 12, wherein the sounding reference signal processing unit calculates the signal-to-interference and noise ratio (SINR) on each transmission symbol using the complex channel matrix (H) and the noise variance ($\sigma^2$).

* * * * *